(12) United States Patent
Ashworth

(10) Patent No.: US 10,673,518 B2
(45) Date of Patent: Jun. 2, 2020

(54) CROSSOVER ISOLATION REDUCTION IN A SIGNAL BOOSTER

(71) Applicant: WILSON ELECTRONICS, LLC, St. George, UT (US)

(72) Inventor: Christopher Ken Ashworth, St. George, UT (US)

(73) Assignee: WILSON ELECTRONICS, LLC, St. George, UT (US)

( * ) Notice: Subject to any disclaimer, the term of this patent is extended or adjusted under 35 U.S.C. 154(b) by 0 days.

(21) Appl. No.: 16/016,030

(22) Filed: Jun. 22, 2018

(65) Prior Publication Data
US 2018/0375565 A1 Dec. 27, 2018

Related U.S. Application Data

(60) Provisional application No. 62/525,629, filed on Jun. 27, 2017.

(51) Int. Cl.
*H04B 7/155* (2006.01)
*H04B 7/0413* (2017.01)

(52) U.S. Cl.
CPC ..... *H04B 7/15535* (2013.01); *H04B 7/15578* (2013.01); *H04B 7/0413* (2013.01)

(58) Field of Classification Search
CPC ............ H04B 7/15535; H04B 7/15578; H04B 7/0413
See application file for complete search history.

(56) References Cited

U.S. PATENT DOCUMENTS

| | | | |
|---|---|---|---|
| 4,539,527 A | 9/1985 | Ishigaki et al. |
| 4,595,803 A | 6/1986 | Wright |
| 4,731,869 A | 3/1988 | Farrer |
| 4,776,032 A | 10/1988 | Odate et al. |
| 5,095,528 A | 3/1992 | Leslie et al. |
| 5,303,395 A | 4/1994 | Dayani |
| 5,737,687 A | 4/1998 | Martin et al. |
| 5,777,530 A | 7/1998 | Nakatuka |
| 5,787,336 A | 7/1998 | Hirschfield et al. |

(Continued)

FOREIGN PATENT DOCUMENTS

EP 1525678 B1 7/2008

OTHER PUBLICATIONS

3GPP2 C.S0011-B; "Recommended Minimum Performance Standards for cdma2000® Spread Spectrum Mobile Stations"; TIA-98-E; (Dec. 13, 2002); 448 pages; Release B, Version 1, Revision E.

(Continued)

*Primary Examiner* — Brian T O'Connor
(74) *Attorney, Agent, or Firm* — Thorpe North & Western

(57) ABSTRACT

Technology for a repeater is disclosed. The repeater can include a first-direction signal path for a first-direction band. The repeater can include a second-direction signal path for a second-direction band. The repeater can include a controller configured to decrease a gain of the first-direction signal path by a first amount. The controller can increase a gain of the second-direction signal path by a second amount when the gain of the first-direction signal path is decreased by the first amount to enable a total loop gain of the first-direction signal path and the second-direction signal path to be less than a total loop crossover isolation level of the first-direction signal path and the second-direction signal path.

32 Claims, 7 Drawing Sheets

(56) References Cited

U.S. PATENT DOCUMENTS

| | | | |
|---|---|---|---|
| 5,815,795 A | 9/1998 | Iwai | |
| 5,835,848 A | 11/1998 | Bi et al. | |
| 6,005,884 A | 12/1999 | Cook et al. | |
| 6,038,460 A * | 3/2000 | Aleiner | H04B 1/18 455/251.1 |
| 6,384,681 B1 | 5/2002 | Bonds | |
| 6,584,081 B1 | 6/2003 | Lee et al. | |
| 6,711,388 B1 | 3/2004 | Neitiniemi | |
| 6,889,033 B2 | 5/2005 | Bongfeldt | |
| 6,892,080 B2 | 5/2005 | Friesen et al. | |
| 6,990,313 B1 | 1/2006 | Yarkosky | |
| 7,035,587 B1 | 4/2006 | Yarkosky | |
| 7,184,703 B1 | 2/2007 | Naden et al. | |
| 7,221,967 B2 | 5/2007 | Van Buren et al. | |
| 7,233,771 B2 | 6/2007 | Proctor, Jr. et al. | |
| 7,245,880 B1 | 7/2007 | Jacobsen | |
| 7,409,186 B2 | 8/2008 | Van Buren et al. | |
| 7,620,380 B2 | 11/2009 | Hendrix et al. | |
| 7,809,072 B2 * | 10/2010 | Oh | H04L 25/03171 370/334 |
| 7,974,573 B2 | 7/2011 | Dean | |
| 8,422,540 B1 * | 4/2013 | Negus | H04B 1/38 370/210 |
| 8,638,839 B2 * | 1/2014 | Negus | H04B 1/38 370/210 |
| 8,874,027 B2 * | 10/2014 | Gore | H04B 7/15578 370/315 |
| 9,628,116 B2 * | 4/2017 | Henry | H01Q 1/24 |
| 9,774,368 B2 * | 9/2017 | Schmid | H04B 7/155 |
| 9,955,379 B2 * | 4/2018 | Chen | H04W 28/18 |
| 10,177,836 B2 * | 1/2019 | Hong | H04B 7/15585 |
| 10,243,598 B2 * | 3/2019 | Hahn | H04L 5/14 |
| 10,284,253 B2 * | 5/2019 | Negus | H04W 24/02 |
| 10,284,356 B2 * | 5/2019 | Bharadia | H04L 5/1461 |
| 10,340,600 B2 * | 7/2019 | Henry | H01Q 3/12 |
| 10,356,782 B2 * | 7/2019 | Negus | H04W 72/0453 |
| 10,389,037 B2 * | 8/2019 | Johnson | H01Q 21/00 |
| 2002/0044594 A1 | 4/2002 | Bongfeldt | |
| 2002/0101936 A1 | 8/2002 | Wright et al. | |
| 2003/0123401 A1 | 7/2003 | Dean | |
| 2003/0124997 A1 | 7/2003 | Park | |
| 2003/0211828 A1 | 11/2003 | Dalgleish et al. | |
| 2004/0137854 A1 | 7/2004 | Ge | |
| 2004/0146013 A1 | 7/2004 | Song et al. | |
| 2004/0166802 A1 | 8/2004 | McKay, Sr. et al. | |
| 2004/0219876 A1 | 11/2004 | Baker et al. | |
| 2004/0229586 A1 | 11/2004 | Oshima et al. | |
| 2004/0235417 A1 | 11/2004 | Dean | |
| 2005/0118949 A1 | 6/2005 | Allen et al. | |
| 2005/0272367 A1 | 12/2005 | Rodgers et al. | |
| 2006/0084379 A1 | 4/2006 | O'Neill | |
| 2006/0091950 A1 | 5/2006 | Hayase | |
| 2006/0209997 A1 | 9/2006 | Van Buren et al. | |
| 2007/0071128 A1 | 3/2007 | Meir et al. | |
| 2007/0178928 A1 | 8/2007 | Ode | |
| 2007/0188235 A1 | 8/2007 | Dean | |
| 2007/0197207 A1 | 8/2007 | Carstens et al. | |
| 2007/0268827 A1 | 11/2007 | Csaszar et al. | |
| 2008/0014862 A1 | 1/2008 | Van Buren et al. | |
| 2008/0014863 A1 | 1/2008 | Van Buren et al. | |
| 2008/0076437 A1 | 3/2008 | Wilson et al. | |
| 2008/0081555 A1 | 4/2008 | Kong et al. | |
| 2008/0096483 A1 | 4/2008 | Van Buren et al. | |
| 2008/0212500 A1 | 9/2008 | Zhen et al. | |
| 2008/0278237 A1 | 11/2008 | Blin | |
| 2008/0293370 A1 | 11/2008 | Wood | |
| 2008/0304434 A1 | 12/2008 | Giaretta et al. | |
| 2009/0311985 A1 | 12/2009 | Youssoufian et al. | |
| 2010/0009646 A1 | 1/2010 | Mevel et al. | |
| 2010/0056162 A1 * | 3/2010 | Rolland | H04B 7/15571 455/445 |
| 2010/0093388 A1 | 4/2010 | Bagchi | |
| 2010/0159856 A1 | 6/2010 | Kato et al. | |
| 2010/0248751 A1 | 9/2010 | Tsutsui | |
| 2010/0284445 A1 * | 11/2010 | Barriac | H04B 7/15535 375/211 |
| 2010/0321219 A1 | 12/2010 | Li | |
| 2011/0105060 A1 | 5/2011 | Kim et al. | |
| 2011/0151775 A1 | 6/2011 | Kang et al. | |
| 2011/0190028 A1 | 8/2011 | Hahn et al. | |
| 2011/0201269 A1 * | 8/2011 | Hobbs | H04B 7/15535 455/9 |
| 2011/0217943 A1 | 9/2011 | Ashworth et al. | |
| 2015/0085708 A1 * | 3/2015 | Khlat | H04L 5/14 370/277 |
| 2015/0381243 A1 * | 12/2015 | Park | H04B 7/04 370/338 |
| 2018/0219609 A1 * | 8/2018 | Ashworth | H04B 1/0057 |
| 2018/0227925 A1 * | 8/2018 | Gebhard | H04W 72/082 |
| 2018/0301998 A1 * | 10/2018 | Fogel | H02M 3/33561 |
| 2019/0013925 A1 * | 1/2019 | Negus | H04L 5/1461 |
| 2019/0089452 A1 * | 3/2019 | Ashworth | H04B 7/15542 |

OTHER PUBLICATIONS

ADL5513; "1 MHz to 4 GHz, 80 dB Logarithmic Detector / Controller"; Data Sheet; (2008); 25 pages.

HMC713LP3E; "54 dB, Logarithmic Detector / Controller, 50-8000 MHz"; Data Sheet; (2010); 12 pages.

HMC909LP4E; "RMS Power Detector Single-Ended, DC—5.8 GHz"; Data Sheet; (2010); 21 pages.

PIC16F873; "28/40-Pin 8-Bit CMOS FLASH Microcontrollers"; Data Sheet; (2001); 218 pages.

* cited by examiner

CROSSOVER ISOLATION REDUCTION IN A SIGNAL BOOSTER

RELATED APPLICATIONS

The present application claims the benefit of U.S. Provisional Patent Application No. 62/525,629, filed Jun. 27, 2017, the entire specification of which is hereby incorporated by reference in its entirety for all purposes.

BACKGROUND

Signal boosters and repeaters can be used to increase the quality of wireless communication between a wireless device and a wireless communication access point, such as a cell tower. Signal boosters can improve the quality of the wireless communication by amplifying, filtering, and/or applying other processing techniques to uplink and downlink signals communicated between the wireless device and the wireless communication access point.

As an example, the signal booster can receive, via an antenna, downlink signals from the wireless communication access point. The signal booster can amplify the downlink signal and then provide an amplified downlink signal to the wireless device. In other words, the signal booster can act as a relay between the wireless device and the wireless communication access point. As a result, the wireless device can receive a stronger signal from the wireless communication access point. Similarly, uplink signals from the wireless device (e.g., telephone calls and other data) can be directed to the signal booster. The signal booster can amplify the uplink signals before communicating, via an antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
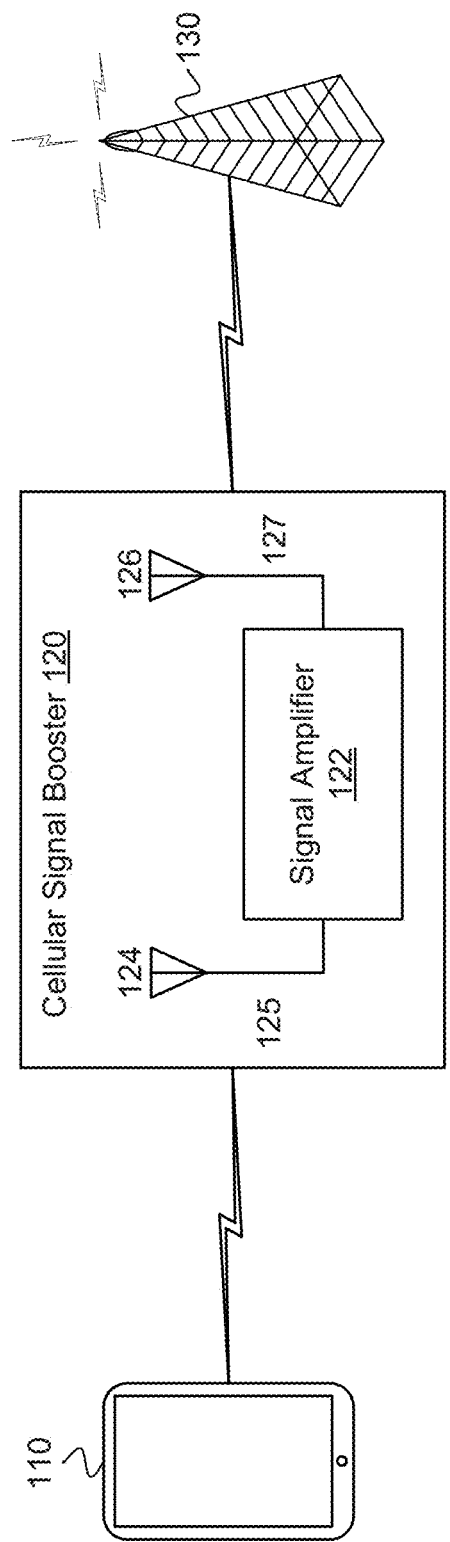
FIG. 1 illustrates a signal booster in communication with a wireless device and a base station in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 illustrates an exemplary signal booster 120 in communication with a wireless device 110 and a base station 130. The signal booster 120 can be referred to as a repeater. A repeater can be an electronic device used to amplify (or boost) signals. The signal booster 120 (also referred to as a cellular signal amplifier) can improve the quality of wireless communication by amplifying, filtering, and/or applying other processing techniques via a signal amplifier 122 to uplink signals communicated from the wireless device 110 to the base station 130 and/or downlink signals communicated from the base station 130 to the wireless device 110. In other words, the signal booster 120 can amplify or boost uplink signals and/or downlink signals bi-directionally. In one example, the signal booster 120 can be at a fixed location, such as in a home or office. Alternatively, the signal booster 120 can be attached to a mobile object, such as a vehicle or a wireless device 110.

In one configuration, the signal booster 120 can include an integrated device antenna 124 (e.g., an inside antenna or a coupling antenna) and an integrated node antenna 126 (e.g., an outside antenna). The integrated node antenna 126 can receive the downlink signal from the base station 130. The downlink signal can be provided to the signal amplifier 122 via a second coaxial cable 127 or other type of radio frequency connection operable to communicate radio frequency signals. The signal amplifier 122 can include one or more cellular signal amplifiers for amplification and filtering. The downlink signal that has been amplified and filtered can be provided to the integrated device antenna 124 via a first coaxial cable 125 or other type of radio frequency connection operable to communicate radio frequency signals. The integrated device antenna 124 can wirelessly communicate the downlink signal that has been amplified and filtered to the wireless device 110.

Similarly, the integrated device antenna 124 can receive an uplink signal from the wireless device 110. The uplink signal can be provided to the signal amplifier 122 via the first coaxial cable 125 or other type of radio frequency connection operable to communicate radio frequency signals. The signal amplifier 122 can include one or more cellular signal amplifiers for amplification and filtering. The uplink signal that has been amplified and filtered can be provided to the integrated node antenna 126 via the second coaxial cable 127 or other type of radio frequency connection operable to communicate radio frequency signals. The integrated node antenna 126 can communicate the uplink signal that has been amplified and filtered to the base station 130.

In one example, the signal booster 120 can filter the uplink and downlink signals using any suitable analog or digital filtering technology including, but not limited to, surface acoustic wave (SAW) filters, bulk acoustic wave (BAW) filters, film bulk acoustic resonator (FBAR) filters, ceramic filters, waveguide filters or low-temperature co-fired ceramic (LTCC) filters.

In one example, the signal booster 120 can send uplink signals to a node and/or receive downlink signals from the node. The node can comprise a wireless wide area network (WWAN) access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one configuration, the signal booster 120 used to amplify the uplink and/or a downlink signal is a handheld booster. The handheld booster can be implemented in a sleeve of the wireless device 110. The wireless device sleeve can be attached to the wireless device 110, but can be removed as needed. In this configuration, the signal booster 120 can automatically power down or cease amplification when the wireless device 110 approaches a particular base station. In other words, the signal booster 120 can determine to stop performing signal amplification when the quality of uplink and/or downlink signals is above a defined threshold based on a location of the wireless device 110 in relation to the base station 130.

In one example, the signal booster 120 can include a battery to provide power to various components, such as the signal amplifier 122, the integrated device antenna 124 and the integrated node antenna 126. The battery can also power the wireless device 110 (e.g., phone or tablet). Alternatively, the signal booster 120 can receive power from the wireless device 110.

In one configuration, the signal booster 120 can be a Federal Communications Commission (FCC)-compatible consumer signal booster. As a non-limiting example, the signal booster 120 can be compatible with FCC Part 20 or 47 Code of Federal Regulations (C.F.R.) Part 20.21 (Mar. 21, 2013). In addition, the signal booster 120 can operate on the frequencies used for the provision of subscriber-based services under parts 22 (Cellular), 24 (Broadband PCS), 27 (AWS-1, 700 MHz Lower A-E Blocks, and 700 MHz Upper C Block), and 90 (Specialized Mobile Radio) of 47 C.F.R. The signal booster 120 can be configured to automatically self-monitor its operation to ensure compliance with applicable noise and gain limits. The signal booster 120 can either self-correct or shut down automatically if the signal booster's operations violate the regulations defined in FCC Part 20.21.

In one configuration, the signal booster 120 can improve the wireless connection between the wireless device 110 and the base station 130 (e.g., cell tower) or another type of wireless wide area network (WWAN) access point (AP). The signal booster 120 can boost signals for cellular standards, such as the Third Generation Partnership Project (3GPP) Long Term Evolution (LTE) Release 8, 9, 10, 11, 12, or 13 standards or Institute of Electronics and Electrical Engineers (IEEE) 802.16. In one configuration, the signal booster 120 can boost signals for 3GPP LTE Release 13.0.0 (March 2016) or other desired releases. The signal booster 120 can boost signals from the 3GPP Technical Specification 36.101 (Release 12 Jun. 2015) bands or LTE frequency bands. For example, the signal booster 120 can boost signals from the LTE frequency bands: 2, 4, 5, 12, 13, 17, and 25. In addition, the signal booster 120 can boost selected frequency bands based on the country or region in which the signal booster is used, including any of bands 1-70 or other bands, as disclosed in ETSI TS136 104 V13.5.0 (2016 October).

The number of LTE frequency bands and the level of signal improvement can vary based on a particular wireless device, cellular node, or location. Additional domestic and international frequencies can also be included to offer increased functionality. Selected models of the signal booster 120 can be configured to operate with selected frequency bands based on the location of use. In another example, the signal booster 120 can automatically sense from the wireless device 110 or base station 130 (or GPS, etc.) which frequencies are used, which can be a benefit for international travelers.

In one example, the integrated device antenna 124 and the integrated node antenna 126 can be comprised of a single antenna, an antenna array, or have a telescoping form-factor. In another example, the integrated device antenna 124 and the integrated node antenna 126 can be a microchip antenna. An example of a microchip antenna is AMMAL001. In yet another example, the integrated device antenna 124 and the integrated node antenna 126 can be a printed circuit board (PCB) antenna. An example of a PCB antenna is TE 2118310-1.

In one example, the integrated device antenna 124 can receive uplink (UL) signals from the wireless device 100 and transmit DL signals to the wireless device 100 using a single antenna. Alternatively, the integrated device antenna 124 can receive UL signals from the wireless device 100 using a dedicated UL antenna, and the integrated device antenna 124 can transmit DL signals to the wireless device 100 using a dedicated DL antenna.

In one example, the integrated device antenna 124 can communicate with the wireless device 110 using near field communication. Alternatively, the integrated device antenna 124 can communicate with the wireless device 110 using far field communication.

In one example, the integrated node antenna 126 can receive downlink (DL) signals from the base station 130 and transmit uplink (UL) signals to the base station 130 via a single antenna. Alternatively, the integrated node antenna 126 can receive DL signals from the base station 130 using a dedicated DL antenna, and the integrated node antenna 126 can transmit UL signals to the base station 130 using a dedicated UL antenna.

In one configuration, multiple signal boosters can be used to amplify UL and DL signals. For example, a first signal booster can be used to amplify UL signals and a second signal booster can be used to amplify DL signals. In addition, different signal boosters can be used to amplify different frequency ranges.

In one configuration, the signal booster 120 can be configured to identify when the wireless device 110 receives a relatively strong downlink signal. An example of a strong downlink signal can be a downlink signal with a signal strength greater than approximately −80 dBm. The signal booster 120 can be configured to automatically turn off selected features, such as amplification, to conserve battery life. When the signal booster 120 senses that the wireless device 110 is receiving a relatively weak downlink signal, the integrated booster can be configured to provide amplification of the downlink signal. An example of a weak downlink signal can be a downlink signal with a signal strength less than −80 dBm.

In one example, the signal booster 120 can also include one or more of: a waterproof casing, a shock absorbent casing, a flip-cover, a wallet, or extra memory storage for the wireless device. In one example, extra memory storage can be achieved with a direct connection between the signal booster 120 and the wireless device 110. In another example, Near-Field Communications (NFC), Bluetooth v4.0, Bluetooth Low Energy, Bluetooth v4.1, Bluetooth v4.2, Bluetooth 5, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, or IEEE 802.11ad can be used to couple the signal booster 120 with the wireless device 110 to enable data from the wireless device 110 to be communicated to and stored in the extra memory storage that is integrated in the signal booster 120. Alternatively, a connector can be used to connect the wireless device 110 to the extra memory storage.

In one example, the signal booster 120 can include photovoltaic cells or solar panels as a technique of charging the integrated battery and/or a battery of the wireless device 110. In another example, the signal booster 120 can be configured to communicate directly with other wireless devices with signal boosters. In one example, the integrated node antenna 126 can communicate over Very High Frequency (VHF) communications directly with integrated node antennas of other signal boosters. The signal booster 120 can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band. Examples of such ISM bands include 2.4 GHz, 3.6 GHz, 4.9 GHz, 5 GHz, or 5.9 GHz. This configuration can allow data to pass at high rates between multiple wireless devices with signal boosters. This configuration can also allow users to send text messages, initiate phone calls, and engage in video communications between wireless devices with signal boosters. In one example, the integrated node antenna 126 can be configured to couple to the wireless device 110. In other words, communications between the integrated node antenna 126 and the wireless device 110 can bypass the integrated booster.

In another example, a separate VHF node antenna can be configured to communicate over VHF communications directly with separate VHF node antennas of other signal boosters. This configuration can allow the integrated node antenna 126 to be used for simultaneous cellular communications. The separate VHF node antenna can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band.

In one configuration, the signal booster 120 can be configured for satellite communication. In one example, the integrated node antenna 126 can be configured to act as a satellite communication antenna. In another example, a separate node antenna can be used for satellite communications. The signal booster 120 can extend the range of coverage of the wireless device 110 configured for satellite communication. The integrated node antenna 126 can receive downlink signals from satellite communications for the wireless device 110. The signal booster 120 can filter and amplify the downlink signals from the satellite communication. In another example, during satellite communications, the wireless device 110 can be configured to couple to the signal booster 120 via a direct connection or an ISM radio band. Examples of such ISM bands include 2.4 GHz, 3.6 GHz, 4.9 GHz, 5 GHz, or 5.9 GHz.

In one configuration, traditional signal boosters (or repeaters) with separate uplink and downlink signal paths, uplink and downlink filters can pass uplink and downlink signals, respectively, but each can have a certain level of roll-off. There is a loop problem where the two filters cross in the middle of the guard band. The middle of the guard band can correspond to where the two filters will typically cross, and this point can be amplified on uplink and downlink. To ensure that this amplification is below a certain level, the signal booster can be subject to a crossover isolation (or midband isolation) requirement, which requires that there should be more crossover isolation than loop gain. In other words, there should be more crossover isolation than loop gain at that crossover point (or midband point), which is often only achievable using custom filters. These custom filters can start filtering before the passband ends in order to obtain enough attenuation at that crossover point. Therefore, these custom filters can be designed to achieve sufficient crossover isolation. However, the usage of custom filters in signal boosters due to unique crossover isolation design criteria can be undesirable, and it would be more desirable to use off-the-shelf filters.

In one example, increasing a gain for a selected band on a selected signal path in the signal booster can increase the crossover isolation requirement for the signal booster. The increase to the crossover isolation requirement necessitates that an increased number of bandpass filters be designed into the signal booster. In other words, the increased number of bandpass filters would be needed to obtain sufficient crossover isolation to satisfy the increased crossover isolation requirement. The increased number of bandpass filters can increase a cost of the signal booster. In addition, the increased number of bandpass filters can lead to a higher amplitude ripple for the signal booster.

In the present technology, as described in further detail below, a signal booster can include a downlink signal path and an uplink signal path, and a gain in the downlink signal path can be reduced when a gain in the uplink signal path is increased (e.g., for a bump-up during oscillation margin detection), or vice versa, which can lead to a reduced crossover isolation requirement. The increased gain for the uplink signal path during bump-up can increase the required crossover isolation, so reducing the gain in the downlink signal path can reduce the crossover isolation requirement (which reduces a number of required bandpass filters for the signal booster). Alternatively, a gain stage in the downlink signal path can be disabled when the gain in the uplink signal path is increased, or vice versa. The reduced number of bandpass filters in the signal booster can lead to a lower passband amplitude ripple and a reduced signal booster cost. In addition, since the bump-up occurs infrequently in the signal booster, a performance and/or call quality of the signal booster may not be impacted by reducing the gain or disabling a gain stage in one of the uplink signal path or the downlink signal path.

Figure 2:
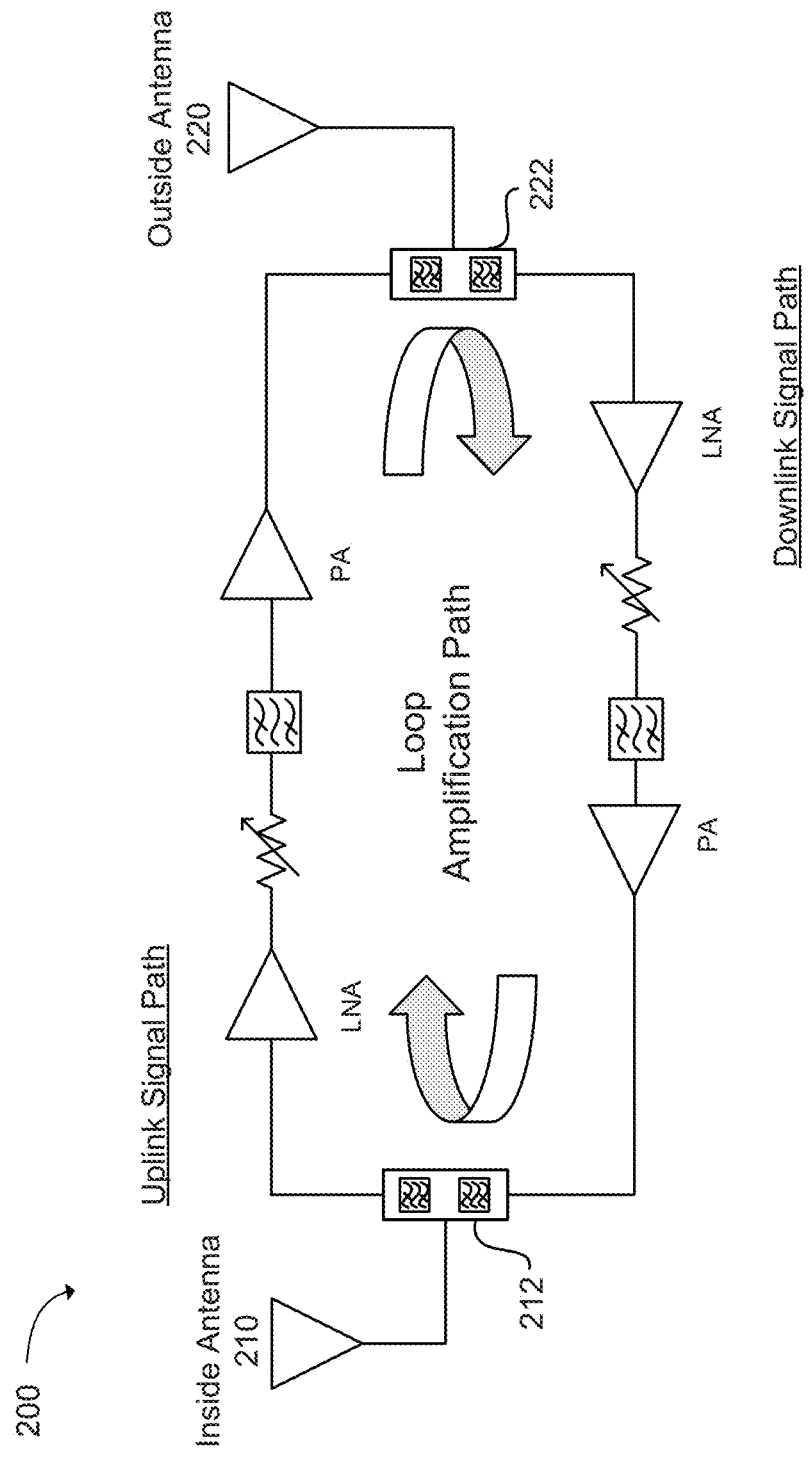
FIG. 2 illustrates crossover isolation in a signal booster in accordance with an example.

FIG. 2 illustrates an exemplary signal booster 200 (or repeater). The signal booster 200 can include an inside antenna 210 and a first duplexer 212 communicatively coupled to the inside antenna 210. The signal booster 200 can include an outside antenna 220 and a second duplexer 222 communicatively coupled to the outside antenna 220. The signal booster 200 can include an uplink signal path and a downlink signal path. The uplink signal path and the downlink signal path can be communicatively coupled between the first duplexer 212 and the second duplexer 222.

In one example, the uplink signal path can include a low noise amplifier (LNA), a bandpass filter and a power amplifier (PA). Similarly, the downlink signal path can include a LNA, a bandpass filter and a PA. In the downlink, there can be 20 decibels (dB) of gain per LNA and PA, which can result in 40 dB of downlink gain. In the uplink, there can be 20 dB of gain per LNA and PA, which can result in 40 dB of uplink gain. In the downlink, there can be 2 dB of loss per passive component or bandpass filter (i.e., a total of 6 dB of loss for the LNA, the bandpass filter and the PA in the downlink signal path). Similarly, in the uplink, there can be 2 dB of loss per passive component or bandpass filter (i.e., a total of 6 dB of loss for the LNA, the bandpass filter and the PA in the uplink signal path). Therefore, the total loop gain in the signal booster 200 can be 68 dB. In addition, there can be a requirement of 12 dB of crossover isolation in each bandpass filter (two filters total) and a requirement of 30 dB of crossover isolation in each duplexer (two duplexers total), which results in a total loop crossover isolation requirement of 84 dB. Since the total loop crossover isolation should be greater than the total loop gain, this configuration would be acceptable (i.e., 84 dB of total loop crossover isolation is greater than 68 dB of total loop gain).

However, in this example, increasing the uplink gain and/or the downlink gain without increasing the number of bandpass filters in the uplink signal path and/or the downlink signal path may cause the total loop crossover isolation to not be greater than the total loop gain. In other words, in this example, the total loop crossover isolation may be less than the total loop gain. In this case, the configuration of the signal booster 200 would not be acceptable.

Figure 3:
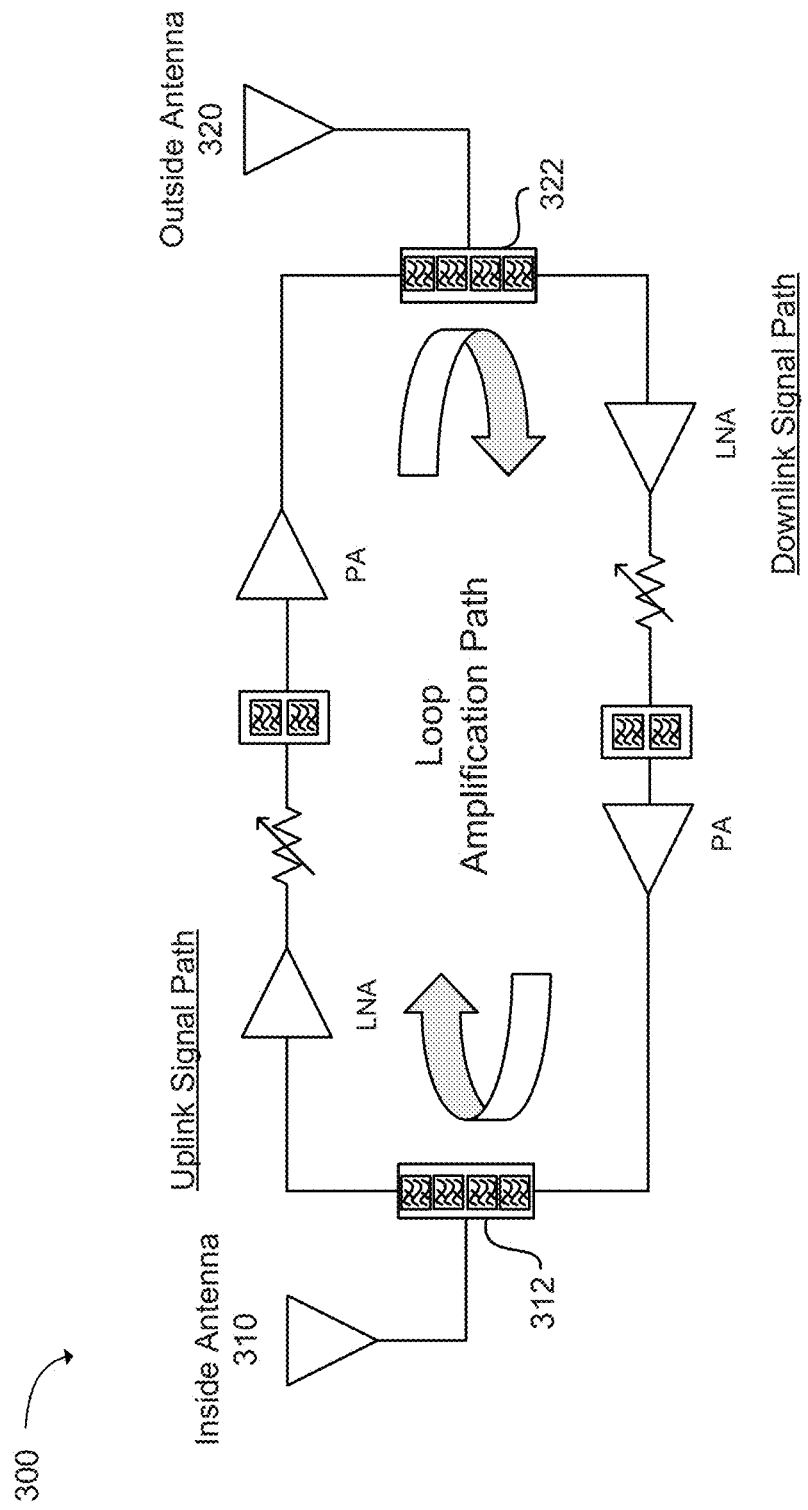
FIG. 3 illustrates crossover isolation in a signal booster in accordance with an example.

FIG. 3 illustrates an exemplary signal booster 300 (or repeater). The signal booster 300 can include an inside antenna 310 and a first duplexer 312 communicatively coupled to the inside antenna 310. The signal booster 300 can include an outside antenna 320 and a second duplexer 322 communicatively coupled to the outside antenna 320. The signal booster 300 can include an uplink signal path and a downlink signal path. The uplink signal path and the downlink signal path can be communicatively coupled between the first duplexer 312 and the second duplexer 322. In this example, the first duplexer 312 and the second duplexer 324 can be dual-input single-output (DISO) analog bandpass filters.

In one example, the uplink signal path can include a low noise amplifier (LNA), a bandpass filter and a power amplifier (PA). Similarly, the downlink signal path can include a LNA, a bandpass filter and a PA. In this example, the bandpass filters in the uplink signal path and the downlink signal path can be single-input single-output (SISO) analog bandpass filters. In the downlink, there can be 20 dB of gain per LNA and PA, which can result in 40 dB of downlink gain. In the uplink, there can be 20 dB of gain per LNA and PA, which can result in 40 dB of uplink gain. In the downlink, there can be 2 dB of loss per passive component or bandpass filter (i.e., a total of 6 dB of loss for the LNA, the bandpass filter and the PA in the downlink signal path). Similarly, in the uplink, there can be 2 dB of loss per passive component or bandpass filter (i.e., a total of 6 dB of loss for the LNA, the bandpass filter and the PA in the uplink signal path). Therefore, the total loop gain in the signal booster 200 can be 68 dB. In addition, there can be a requirement of 12 dB of crossover isolation in each bandpass filter (two filters total) and a requirement of 30 dB of crossover isolation in each duplexer (two duplexers total), which results in a total loop crossover isolation requirement of 84 dB. Since the total loop crossover isolation should be greater than the total loop gain, this configuration would be acceptable (i.e., 84 dB of total loop crossover isolation is greater than 68 dB of total loop gain).

Figure 4:
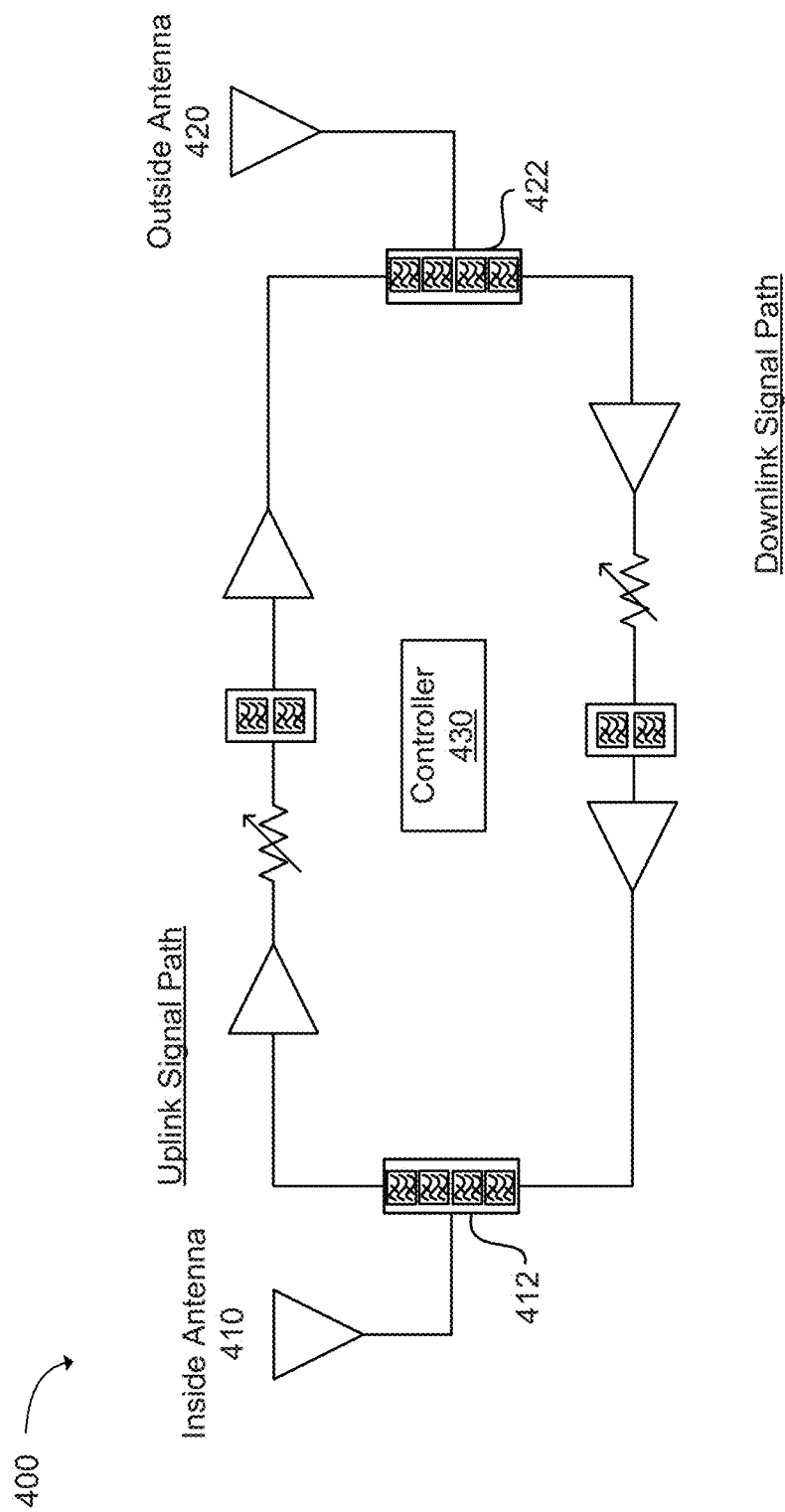
FIG. 4 illustrates a signal booster operable to adjust gains in signal paths in accordance with an example.

FIG. 4 illustrates an exemplary signal booster 400 (or repeater). The signal booster 400 can include an inside antenna 410 and a first duplexer 412 communicatively coupled to the inside antenna 410. The signal booster 400 can include an outside antenna 420 and a second duplexer 422 communicatively coupled to the outside antenna 420. The signal booster 400 can include an uplink signal path and a downlink signal path. The uplink signal path and the downlink signal path can be communicatively coupled between the first duplexer 412 and the second duplexer 422. In this example, the first duplexer 412 and the second duplexer 424 can be dual-input single-output (DISO) analog bandpass filters. In addition, in this example, the uplink signal path and the downlink signal path can each include one or more amplifiers (e.g., LNA, PA) and one or more bandpass filters. In this example, the bandpass filters can be single-input single-output (SISO) analog bandpass filters.

In one configuration, the signal booster 400 can include a controller 430. The controller 430 can be configured to reduce oscillation in the signal booster 400. Generally speaking, the oscillation can be created when outside and inside antennas that are internally located in the signal booster 400 are within a defined distance from each other, such that a level of booster amplification is greater than a path loss between the antennas and a positive feedback loop exists. With signal boosters, two antennas that are within a defined distance or proximity from each other can produce an RF squeal.

From an installation perspective, a customer may install signal booster antennas relatively close to each other (e.g., due to constraints in a home), but a greater gain of the signal booster requires that the antennas be installed further away from each other. When antennas are installed relatively close to each other, the oscillation can occur in either a downlink path or an uplink path. In some cases, downlink and/or uplink signals can be analyzed to determine the presence of or confirm an oscillation created by an amplifier in the signal booster.

In one example, oscillations can be caused due to feedback or noise, which can be amplified in the signal booster 400 over a period of time. Since the signal booster 400 can include both the uplink signal path and the downlink signal path, there is a loop that has the potential to cause internal oscillations. For example, in a feedback path from one antenna to another antenna, one antenna can transmit to the other antenna. An oscillation can occur when a loss between antennas is less than a gain in the signal booster 400. An oscillation may not occur when a loss between the antennas is greater than a gain in the signal booster 400. In addition, an oscillation can occur when an output port of the signal booster 400 couples back to an input port of the signal booster due to poor shielding.

In one example, the outside antenna 420 in the signal booster 400 can receive a signal outside a building and transmit the signal to the one or more amplifiers. The one or more amplifiers can boost the signal and then send an amplified signal to the inside antenna 410. The inside antenna 410 can broadcast the amplified signal to an area with poor signal coverage. An oscillation can occur when a broadcasted signal from the inside antenna 410 is detected by the outside antenna 420, and the broadcasted signal is passed through the signal booster 400 again, which can result in a background noise. This noise can result in poor reception on the device being used. In some cases, the signal booster 400 can automatically reduce their capabilities or shut down when an oscillation or feedback begins to occur.

In one configuration, the controller 430 can detect an oscillation in the signal booster 400. The controller 430 can reduce a gain in the signal booster 400 by a first amount (in dB) to cease the oscillation in the signal booster 400. In other words, the oscillation can be stopped or mitigated by reducing the gain by the first amount in the signal booster 400 to an oscillation threshold level at which oscillation begins. This level can be a predetermined threshold level based on certain non-linearities that occur in oscillation. More specifically, the controller 430 can reduce the gain for a selected band in a selected signal path (i.e., the uplink signal path or the downlink signal path) in the signal booster 400. In addition, the controller 430 can reduce the gain in the signal booster 400 further, below the oscillation threshold level, by a second amount (in dB) to create an oscillation margin. The oscillation margin can be a margin between an operating gain of the signal booster 400 and a gain at which oscillation begins (the oscillation threshold level) in the signal booster 400. The oscillation margin can ensure that a noise floor does not rise above a level allowed by the set oscillation margin. More specifically, the controller 430 can further reduce the gain for the selected band in the selected signal path (i.e., the uplink signal path or the downlink signal path) in the signal booster 400, thereby creating the oscillation margin.

In one example, the controller 430 can detect a presence of an oscillation for each individual band in the signal booster 400. The controller 430 can reduce a gain for a given band by the first amount to stop the oscillation, and then reduce the gain for that same band by the second amount to confirm the existence of the oscillation margin. The controller 430 can repeat this procedure for each band supported in the signal booster 400.

In one example, the controller 430 can periodically increase the gain in the signal booster 400. The gain can be periodically increased to confirm an existence of the oscillation margin (i.e., an expected oscillation margin). More specifically, the controller 430 can increase the gain for a selected band in a selected signal path (i.e., the uplink signal path or the downlink signal path) in the signal booster 400. This increase in gain can be referred to as a 'bump-up'. For example, the controller 430 can increase the gain by the oscillation margin to confirm the existence of the oscillation margin. In one example, a feedback path can be changed due to a variety of issues, such as time, temperature, objects moving around, a vehicle or the mobile device moving around, etc. The feedback path can be changed when one of the antennas are bumped or moved. Therefore, to ensure that the oscillation margin (e.g., 5 dB) is still present (and is at an expected level), the signal booster 400 can be periodically bumped up (i.e., the gain can be increased to remove the oscillation margin to ensure that the oscillation margin is still accurate).

In one example, the amount of amplification applied by the signal booster 400 can change due to a number of factors, including changes in the atmosphere, movement of objects around the inside and outside antennas 410, 420, movement of the inside and outside antennas 410, 420, movement of the wireless device, and so forth. The periodic bump-up (or increase of the gain in the signal booster 400) can function to remove the oscillation margin to ensure that the signal booster 400 is still operating within the oscillation margin.

In one configuration, the signal booster 400 can be turned on, and the controller 430 can detect an oscillation. The signal booster 400 can add noise to the network. The noise (or noise floor) can increase as a donor and server booster antennas become closer together. Upon detection of the oscillation, the controller 430 can reduce a gain in the signal booster 400 until the signal booster 400 stops oscillating at the oscillation threshold level. Then, the controller 430 can drop the gain below the oscillation threshold level by the oscillation margin (e.g., 5 dB). In this example, after dropping the gain by the oscillation margin, there is 5 dB of margin before the signal booster 400 is operating at or above the oscillation threshold level. Then, the signal booster 400 can periodically increase the gain (e.g., every 10 minutes) to confirm an expected oscillation margin. When this occurs, the controller 430 in the signal booster 400 can increase the gain by the oscillation margin (e.g., 5 dB), thereby confirming the expected oscillation margin.

In one example, the signal booster 400 can operate at a certain amount of gain (e.g., 70 dB), and the signal booster 400 can operate with a certain amount of oscillation margin (e.g., 2 or 3 dB). In another example, a regulatory body, such as the FCC, can require that the signal booster 400 operates at a certain amount of oscillation margin (e.g., 6 dB). In another example, the signal booster 400 can operate at a certain amount of gain (e.g., 23 dB), and the signal booster 400 can operate with a certain amount of oscillation margin (e.g., 6 dB).

In one configuration, the increase in the gain for oscillation margin detection can cause an increase in a crossover isolation (or midband isolation) requirement for the signal booster 400. As previously described, the signal booster 400 can be in accordance with the crossover isolation requirement, which states that a total loop crossover isolation of the signal booster 400 should be greater than a total loop gain of the signal booster 400. Therefore, increasing the uplink gain and/or the downlink gain in the signal booster 400 without increasing a number of bandpass filters in the uplink signal path and/or the downlink signal path may cause the total loop crossover isolation to not be greater than the total loop gain.

As an example, the signal booster 400 can periodically increase the gain by 6 dB to confirm the oscillation margin in accordance with an FCC requirement for the signal booster 400. However, increasing the gain by 6 dB can lead to an increase in the crossover isolation requirement for the signal booster 400.

In one configuration, the controller 430 can eliminate or reduce an increase to the crossover isolation requirement due to the increase in the gain for a particular signal path (or bump-up) during oscillation detection. The controller 430 can eliminate or reduce an increase to a total loop gain for the signal booster 400 due to the increase in the gain for the particular signal path (or bump-up) by reducing the gain for an opposite signal path. In other words, by reducing the gain on a signal path when the gain is increased for the opposite signal path, the total loop gain for the signal booster 400 can remain the same (or close to the same). The controller 430 can reduce the gain on the signal path before increasing the gain for the opposite signal path. In one example, the controller 430 can decrease the gain of the downlink signal path before increasing the gain of the uplink signal path. Alternatively, the controller 430 can decrease the gain of the uplink signal path before increasing the gain of the downlink signal path. Since the total loop gain for the signal booster 400 remains the same (or close to the same), the signal booster 400 does not require additional crossover isolation due to the bump-up. As a result, the signal booster 400 does not need an additional number of bandpass filters to handle the crossover isolation requirement for the signal booster 400. The reduced number of bandpass filters can result in a lower passband amplitude ripple for the signal booster 400 and a reduced cost of the signal booster 400.

In one example, the controller 430 can reduce the gain on a first-direction signal path before increasing the gain on a second-direction signal path. In another example, the controller 430 can reduce the gain on a first-direction signal path at substantially the same time as when increasing the gain on a second-direction signal path. In yet another example, the controller 430 can reduce the gain on a first-direction signal path after increasing the gain on a second-direction signal path, but in this example, the gain on the first-direction signal path is reduced within a predefined time window after the gain on the second-direction signal path is increased.

As a non-limiting example, the controller 430 can increase the gain of the uplink signal path by 5 dB for oscillation detection. At the same time or before increasing the gain, the controller 430 can decrease the gain of the downlink signal path by 5 dB (i.e., the decrease in the downlink signal path by 5 dB can be the same as the increase in the uplink signal path by 5 dB), thereby resulting in the same total loop gain for the signal booster 400. As a result, the crossover isolation requirement for the signal booster 400 does not increase due to the gain increase of 5 dB in the uplink signal path for the oscillation detection.

As another non-limiting example, the controller 430 can increase the gain of the uplink signal path by 5 dB for oscillation detection. At the same time or before increasing the gain, the controller 430 can decrease the gain of the downlink signal path by 7 dB (i.e., the decrease in the downlink signal path by 7 dB is more than the increase in the uplink signal path by 5 dB), thereby resulting in a lower total loop gain for the signal booster 400. As a result, the crossover isolation requirement for the signal booster 400 does not increase due to the gain increase of 5 dB in the uplink signal path for the oscillation detection.

In yet another non-limiting example, the controller 430 can increase the gain of the uplink signal path by 5 dB for oscillation detection. At the same time or before increasing the gain, the controller 430 can disable a gain stage in the downlink signal path, thereby resulting in a lower total loop gain for the signal booster 400. As a result, the crossover isolation requirement for the signal booster 400 does not increase due to the gain increase of 5 dB in the uplink signal path for the oscillation detection.

As a non-limiting example, the signal booster 400 can operate at 23 dB of gain, which thereby requires the signal booster 400 to have greater than 23 dB of crossover isolation. In this example, the FCC can require an oscillation margin of 6 dB. The signal booster 400 can periodically bump up the gain of the uplink signal path by 6 dB to detect the oscillation margin. If the signal booster 400 did not correspondingly bump down the downlink signal path when the uplink signal path is increased by 6 dB of gain, then the signal booster 400 would need to have 29 dB of crossover isolation, which would involve having additional bandpass filters in the signal booster 400. Therefore, the signal booster 400 can decrease the gain of the downlink signal path by 6 dB when the gain in the uplink signal path is increased by 6 dB, thereby maintaining the same crossover isolation requirement for the signal booster 400. In other words, since the total loop gain of the signal booster 400 does not increase even during bump-up, the crossover isolation requirement for the signal booster 400 remains the same.

In a more specific configuration, the signal booster 400 can include a first-direction signal path for a first-direction band, and a second-direction signal path for a second-direction band. The first-direction signal path can be an uplink signal path and the first-direction band can be an uplink band, and the second-direction signal path can be a downlink signal path and the second-direction band can be a downlink band. Alternatively, the first-direction signal path can be a downlink signal path and the first-direction band can be a downlink band, and the second-direction signal path can be an uplink signal path and the second-direction band can be an uplink band.

In one example, the controller can decrease a gain of the first-direction signal path by a first amount (in dB). The controller can increase a gain of the second-direction signal path by a second amount (in dB) when the gain of the first-direction signal path is decreased by the first amount to enable a total loop gain of the first-direction signal path and the second-direction signal path to be less than a total loop crossover isolation level of the first-direction signal path and the second-direction signal path. The first amount can be greater than or equal to the second amount. Alternatively, the second amount can be marginally greater than the first amount. In this example, the total loop gain of the first-direction signal path and the second-direction signal path can be less than a total loop crossover isolation level of the first-direction signal path and the second-direction signal path in accordance with a crossover isolation requirement for the signal booster 400.

In one example, the controller 430 can decrease the gain of the first-direction signal path by the first amount in order to reduce or mitigate an increase in a crossover isolation requirement for the signal booster 400 caused by an increase to the gain of the second-direction signal path by the second amount. The reduction or mitigation of the increase in the crossover isolation requirement for the signal booster 400 caused by the increase to the gain of the second-direction signal path can enable a reduced number of bandpass filters in the signal booster 400 and a reduced passband amplitude ripple for the signal booster 400.

In an alternative example, the controller 430 can decrease the gain of the first-direction signal path by the first amount by disabling a gain stage in the first-direction signal path. The controller 430 can disable the gain stage in the first-direction signal path prior to the gain of the second-direction signal path being increased by the first amount to enable the total loop gain of the first-direction signal path and the second-direction signal path to be less than the total loop crossover isolation level of the first-direction signal path and the second-direction signal path.

In one example, the controller 430 can decrease the gain of the first-direction signal path by increasing an attenuation level in the first-direction signal path or by adjusting a variable gain amplifier in the first-direction signal path. In addition, the controller 430 can increase the gain of the second-direction signal path by decreasing an attenuation level in the second-direction signal path or by adjusting a variable gain amplifier in the second-direction signal path. In one example, additional attenuation can be designed into the signal booster 400, and a certain amount of attenuation can be removed to bump up a gain in the first-direction signal path. At the same time, a certain amount of attenuation can be added to bump down a gain in the first-direction signal path. Therefore, attenuation can be increased for a particular signal path when attenuation is decreased for an opposite signal path, or vice versa.

In one example, it can be a slight disadvantage to reduce the gain of the first-direction signal path when the gain of the second-direction signal path is increased. However, the increase of the gain in the second-direction signal path in order to perform oscillation margin detection can occur relatively infrequently (since the inside antenna 410 and the outside antenna 420 are unlikely to change in proximity to each other), and an amount of time that the gain in the first-direction signal path is decreased can be relatively short. Therefore, reducing the gain in the first-direction signal path can have a minimal impact on the signal traveling through the first-direction signal path.

In one configuration, the controller 430 can detect an oscillation in the signal booster 400 and then mitigate the oscillation by decreasing the gain of the second-direction signal path until the oscillation ceases in the signal booster 400. After the oscillation is mitigated, the controller 430 can increase the gain of the second-direction signal path by the second amount to determine an oscillation margin between an operating gain for the second-direction signal path and an oscillation point for the second-direction signal path. This increase in gain can be referred to as a bump-up. The bump-up can occur at either the first-direction signal path or the second-direction signal path at a given time. After the gain is increased in accordance with the bump-up and a proper oscillation margin is confirmed, the controller can 430 restore the gain of the first-direction signal path and/or the second-direction path to a previous amount or a new amount after mitigation of the oscillation in the signal booster 400.

In one configuration, the signal booster 400 can include a plurality of signal paths for a plurality of bands, and an increase in a crossover isolation requirement can be reduced or mitigated for each of the plurality of bands. For example, the signal booster 400 can be a 5-band booster, and the controller 430 can reduce or mitigate an increase in the crossover isolation requirement for the uplink signal path(s) and/or the downlink signal path(s) for each of the bands supported in the signal booster 400. Each band that is supported by the signal booster 400 can have a separate crossover isolation requirement. The controller 430 can individually reduce or mitigate the increase in the crossover isolation requirement for each band, or alternatively, the controller can reduce or mitigate the increase in the crossover isolation requirement for multiple bands at the same time.

Figure 5:
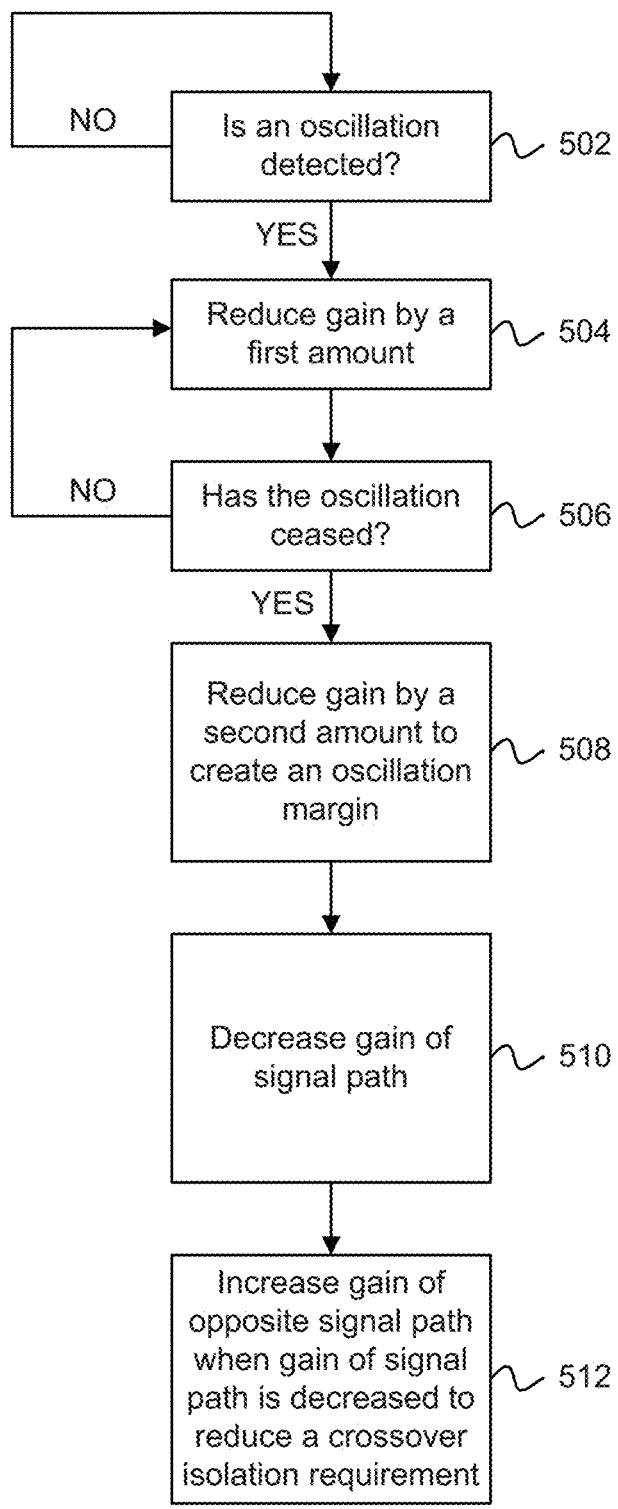
FIG. 5 illustrates a technique for mitigating an oscillation in a signal booster in accordance with an example.

FIG. 5 illustrates an exemplary technique for mitigating an oscillation in a signal booster (or repeater). The technique can be implemented using a controller in the signal booster. In operation 502, the controller can determine whether an oscillation is detected in the signal booster. If an oscillation is not detected in the signal booster, then the controller can continue to check for oscillations that occur in the signal booster. If an oscillation is detected in the signal booster, then the controller can reduce a gain by a first amount (in dB) to mitigate the oscillation, as in operation 504. In operation 506, the controller can determine whether the oscillation has ceased or stopped. If the oscillation has not ceased or stopped, then the controller can continue to reduce the gain until the oscillation has ceased or stopped. In operation 508, the controller can further reduce the gain by a second amount (in dB) to create an oscillation margin. In operation 510, the controller can decrease the gain in a signal path for a selected band. In band 512, the controller can periodically increase (or bump up) the gain in an opposite signal path for a selected band to confirm an existence of the oscillation margin. In other words, the controller can periodically increase the gain to confirm an expected oscillation margin. The controller can decrease the gain in the signal path and then reduce the gain in the opposite signal path to reduce a crossover isolation requirement. In other words, the controller can decrease (or bump down) the gain in the signal path for the selected band and increase (or bump up) the gain in the opposite signal path for the selected band in order to reduce or mitigate an increase to the crossover isolation requirement for the signal booster due to the bump-up. The controller can bump up and bump down the respective signal paths at the same time, or alternatively, the controller can bump down one signal path before bumping up the opposite signal path.

Figure 6:
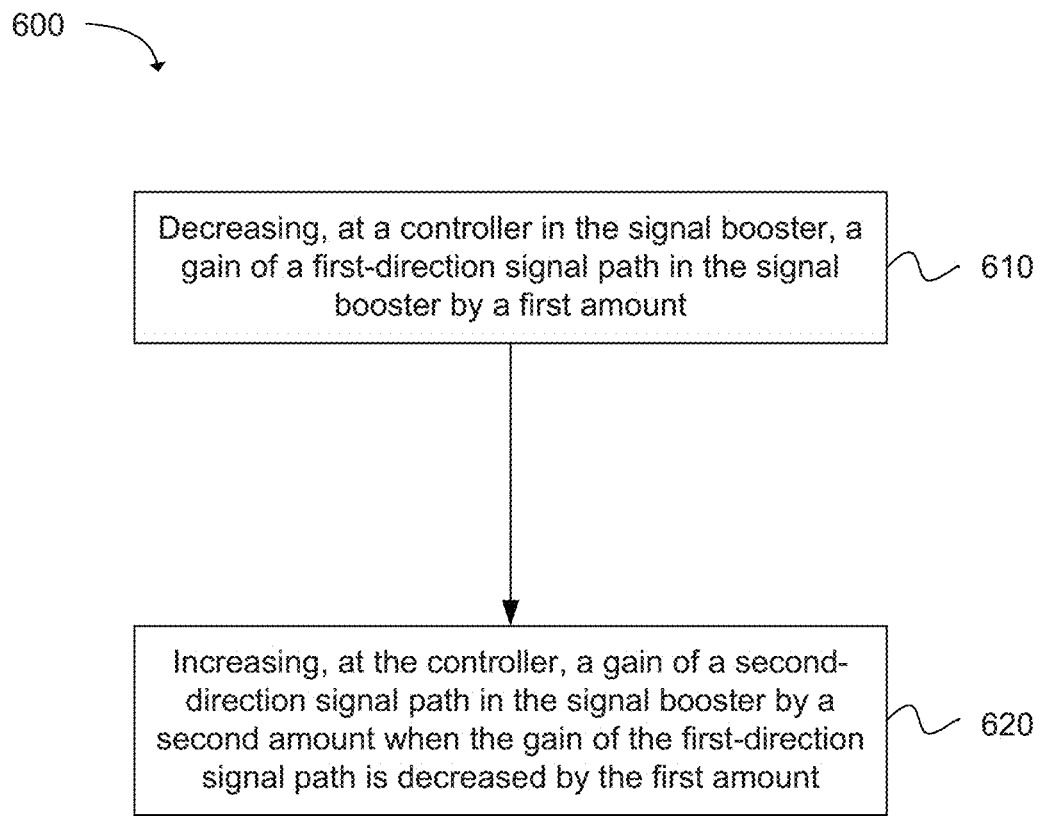
FIG. 6 depicts a flow chart of a method for operating a signal booster in accordance with an example.

FIG. 6 depicts a flow chart of an exemplary method for operating a signal booster. The method can include the operation of decreasing, at a controller in the signal booster, a gain of a first-direction signal path in the signal booster by a first amount, as in block 610. The method can include the operation of increasing, at the controller, a gain of a second-direction signal path in the second booster by a second amount when the gain of the first-direction signal path is decreased by the first amount, wherein the first amount is greater than or equal to the second amount, as in block 620.

Figure 7:
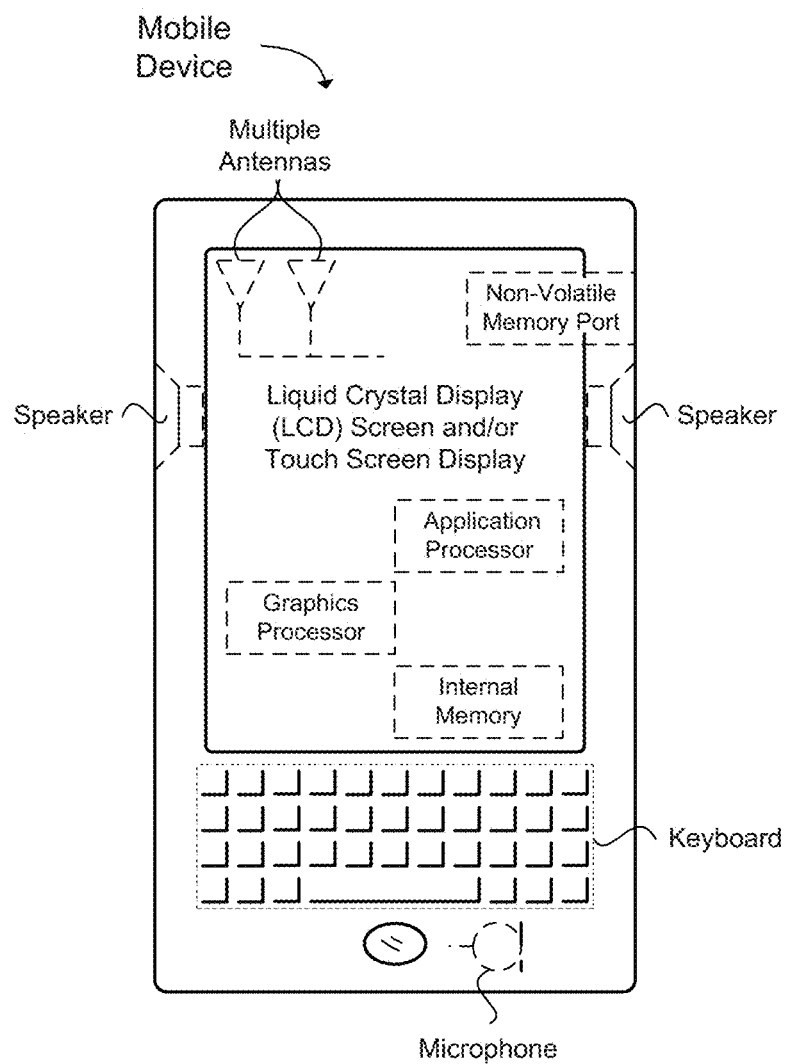
FIG. 7 illustrates a wireless device in accordance with an example.

FIG. 7 provides an example illustration of the wireless device, such as a user equipment (UE), a mobile station (MS), a mobile communication device, a tablet, a handset, a wireless transceiver coupled to a processor, or other type of wireless device. The wireless device can include one or more antennas configured to communicate with a node or transmission station, such as an access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 7 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes a repeater, including: a first-direction signal path for a first-direction band; a second-direction signal path for a second-direction band; and a controller configured to: decrease a gain of the first-direction signal path by a first amount; and increase a gain of the second-direction signal path by a second amount when the gain of the first-direction signal path is decreased by the first amount to enable a total loop gain of the first-direction signal path and the second-direction signal path to be less than a total loop crossover isolation level of the first-direction signal path and the second-direction signal path.

Example 2 includes the repeater of Example 1, in which the total loop gain of the first-direction signal path and the second-direction signal path is to be less than a total loop crossover isolation level of the first-direction signal path and the second-direction signal path in accordance with a crossover isolation requirement for the repeater.

Example 3 includes the repeater of any of Examples 1 to 2, in which the controller is configured to decrease the gain of the first-direction signal path by the first amount in order to reduce or mitigate an increase in a crossover isolation requirement for the repeater caused by an increase to the gain of the second-direction signal path by the second amount.

Example 4 includes the repeater of any of Examples 1 to 3, in which reduction or mitigation of the increase in the crossover isolation requirement for the repeater caused by the increase to the gain of the second-direction signal path enables a reduced number of bandpass filters in the repeater and a reduced passband amplitude ripple for the repeater.

Example 5 includes the repeater of any of Examples 1 to 4, in which the first amount is greater than or equal to the second amount.

Example 6 includes the repeater of any of Examples 1 to 5, in which the gain of the first-direction signal path is decreased before the gain of the second-direction signal path is increased; or the gain of the first-direction signal path is decreased at substantially the same time as when the gain of the second-direction signal path is increased.

Example 7 includes the repeater of any of Examples 1 to 6, in which the controller is configured to decrease the gain of the first-direction signal path by the first amount by disabling a gain stage in the first-direction signal path.

Example 8 includes the repeater of any of Examples 1 to 7, in which the controller is configured to increase the gain of the second-direction signal path by the second amount to determine an oscillation margin between an operating gain for the second-direction signal path and an oscillation point for the second-direction signal path.

Example 9 includes the repeater of any of Examples 1 to 8, in which the controller is configured to mitigate an oscillation in the repeater by decreasing the gain of the second-direction signal path until the oscillation ceases in the repeater.

Example 10 includes the repeater of any of Examples 1 to 9, in which the controller is configured to: restore the gain of the first-direction signal path to a previous amount or a new amount after mitigation of an oscillation in the repeater; and restore the gain of the second-direction signal path to a previous amount or a new amount after mitigation of the oscillation in the repeater.

Example 11 includes the repeater of any of Examples 1 to 10, in which: the first-direction signal path includes one or more amplifiers and one or more filters to amplify and filter signals in the first-direction band; and the second-direction signal path includes one or more amplifiers and one or more filters to amplify and filter signals in the second-direction band.

Example 12 includes the repeater of any of Examples 1 to 11, in which: the first-direction signal path is an uplink signal path and the first-direction band is an uplink band; and the second-direction signal path is a downlink signal path and the second-direction band is a downlink band.

Example 13 includes the repeater of any of Examples 1 to 12, in which: the first-direction signal path is a downlink signal path and the first-direction band is a downlink band; and the second-direction signal path is an uplink signal path and the second-direction band is an uplink band.

Example 14 includes the repeater of any of Examples 1 to 13, further including a plurality of signal paths for a plurality of bands, and an increase in a crossover isolation requirement is reduced or mitigated for each of the plurality of bands.

Example 15 includes the repeater of any of Examples 1 to 14, in which the first amount and the second amount are represented in decibels (dB).

Example 16 includes the repeater of any of Examples 1 to 15, in which the controller is configured to: decrease the gain of the first-direction signal path by increasing an attenuation level in the first-direction signal path or by adjusting a variable gain amplifier in the first-direction signal path; or increase the gain of the second-direction signal path by decreasing an attenuation level in the second-direction signal path or by adjusting a variable gain amplifier in the second-direction signal path.

Example 17 includes a repeater, including: a first-direction signal path for a first-direction band; a second-direction signal path for a second-direction band; and a controller configured to: disable a gain stage in the first-direction signal path; and increase a gain in the second-direction signal path by a selected amount when the gain stage is disabled in the first-direction signal path to enable a total loop gain of the first-direction signal path and the second-direction signal path to be less than a total loop crossover isolation level of the first-direction signal path and the second-direction signal path.

Example 18 includes the repeater of Example 17, in which the total loop gain of the first-direction signal path and the second-direction signal path is to be less than a total loop crossover isolation level of the first-direction signal path and the second-direction signal path in accordance with a crossover isolation requirement for the repeater.

Example 19 includes the repeater of any of Examples 17 to 18, in which the controller is configured to disable the gain stage in the first-direction signal path in order to reduce or mitigate an increase in a crossover isolation requirement for the repeater caused by an increase to the gain of the second-direction signal path by the selected amount.

Example 20 includes the repeater of any of Examples 17 to 19, in which reduction or mitigation of the increase in the crossover isolation requirement for the repeater caused by the increase to the gain of the second-direction signal path enables a reduced number of bandpass filters in the repeater and a reduced passband amplitude ripple for the repeater.

Example 21 includes the repeater of any of Examples 17 to 20, in which the controller is configured to increase the gain of the second-direction signal path by the selected amount to determine an oscillation margin between an operating gain for the second-direction signal path and an oscillation point for the second-direction signal path.

Example 22 includes the repeater of any of Examples 17 to 21, in which the controller is configured to mitigate an oscillation in the repeater by decreasing the gain of the second-direction signal path until the oscillation ceases in the repeater.

Example 23 includes the repeater of any of Examples 17 to 22, in which the controller is configured to: restore the gain of the first-direction signal path to a previous amount or a new amount after mitigation of an oscillation in the repeater; and restore a gain of the second-direction signal path to a previous amount or a new amount after mitigation of the oscillation in the repeater.

Example 24 includes the repeater of any of Examples 17 to 23, in which: the first-direction signal path is an uplink signal path and the first-direction band is an uplink band; and the second-direction signal path is a downlink signal path and the second-direction band is a downlink band.

Example 25 includes the repeater of any of Examples 17 to 24, in which: the first-direction signal path is a downlink signal path and the first-direction band is a downlink band; and the second-direction signal path is an uplink signal path and the second-direction band is an uplink band.

Example 26 includes a method for operating a signal booster, the method including: decreasing, at a controller in the signal booster, a gain of a first-direction signal path in the signal booster by a first amount; and increasing, at the controller, a gain of a second-direction signal path in the second booster by a second amount when the gain of the first-direction signal path is decreased by the first amount.

Example 27 includes the method of Example 26, further including decreasing the gain of the first-direction signal path by the first amount in order to reduce or mitigate an increase in a crossover isolation requirement for the signal booster caused by an increase to the gain of the second-direction signal path by the second amount, and the crossover isolation requirement specifies that the total loop gain of the first-direction signal path and the second-direction signal path is to be less than a total loop crossover isolation level of the first-direction signal path and the second-direction signal path.

Example 28 includes the method of any of Examples 26 to 27, further including decreasing the gain of the first-direction signal path by the first amount by disabling a gain stage in the first-direction signal path.

Example 29 includes the method of any of Examples 26 to 28, further including increasing the gain of the second-direction signal path by the second amount for determining an oscillation margin between an operating gain for the second-direction signal path and an oscillation point for the second-direction signal path.

Example 30 includes the method of any of Examples 26 to 29, further including mitigating an oscillation in the signal booster by decreasing the gain of the second-direction signal path until the oscillation ceases in the signal booster.

Example 31 includes the method of any of Examples 26 to 30, further including: restoring the gain of the first-direction signal path to a previous amount or a new amount after mitigation of an oscillation in the signal booster; and restoring the gain of the second-direction signal path to a previous amount or a new amount after mitigation of the oscillation in the signal booster.

Example 32 includes the method of any of Examples 26 to 31, in which the first amount is greater than or equal to the second amount.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A repeater, comprising:
a first-direction signal path for a first-direction band;
a second-direction signal path for a second-direction band; and
a controller configured to:
decrease a gain of the first-direction signal path by a first amount; and
increase a gain of the second-direction signal path by a second amount when the gain of the first-direction signal path is decreased by the first amount to enable a total loop gain of the first-direction signal path and the second-direction signal path to be less than a total loop crossover isolation level of the first-direction signal path and the second-direction signal path.

2. The repeater of claim 1, wherein the total loop gain of the first-direction signal path and the second-direction signal path is to be less than a total loop crossover isolation level of the first-direction signal path and the second-direction signal path in accordance with a crossover isolation requirement for the repeater.

3. The repeater of claim 1, wherein the controller is configured to decrease the gain of the first-direction signal path by the first amount in order to reduce or mitigate an increase in a crossover isolation requirement for the repeater caused by an increase to the gain of the second-direction signal path by the second amount.

4. The repeater of claim 3, wherein reduction or mitigation of the increase in the crossover isolation requirement for the repeater caused by the increase to the gain of the second-direction signal path enables a reduced number of bandpass filters in the repeater and a reduced passband amplitude ripple for the repeater.

5. The repeater of claim 1, wherein the first amount is greater than or equal to the second amount.

6. The repeater of claim 1, wherein:
the gain of the first-direction signal path is decreased before the gain of the second-direction signal path is increased; or
the gain of the first-direction signal path is decreased at substantially the same time as when the gain of the second-direction signal path is increased.

7. The repeater of claim 1, wherein the controller is configured to decrease the gain of the first-direction signal path by the first amount by disabling a gain stage in the first-direction signal path.

8. The repeater of claim 1, wherein the controller is configured to increase the gain of the second-direction signal path by the second amount to determine an oscillation margin between an operating gain for the second-direction signal path and an oscillation point for the second-direction signal path.

9. The repeater of claim 1, wherein the controller is configured to mitigate an oscillation in the repeater by decreasing the gain of the second-direction signal path until the oscillation ceases in the repeater.

10. The repeater of claim 1, wherein the controller is configured to:
restore the gain of the first-direction signal path to a previous amount or a new amount after mitigation of an oscillation in the repeater; and
restore the gain of the second-direction signal path to a previous amount or a new amount after mitigation of the oscillation in the repeater.

11. The repeater of claim 1, wherein:
the first-direction signal path includes one or more amplifiers and one or more filters to amplify and filter signals in the first-direction band; and
the second-direction signal path includes one or more amplifiers and one or more filters to amplify and filter signals in the second-direction band.

12. The repeater of claim 1, wherein:
the first-direction signal path is an uplink signal path and the first-direction band is an uplink band; and
the second-direction signal path is a downlink signal path and the second-direction band is a downlink band.

13. The repeater of claim 1, wherein:
the first-direction signal path is a downlink signal path and the first-direction band is a downlink band; and the second-direction signal path is an uplink signal path and the second-direction band is an uplink band.

14. The repeater of claim 1, further comprising a plurality of signal paths for a plurality of bands, wherein an increase in a crossover isolation requirement is reduced or mitigated for each of the plurality of bands.

15. The repeater of claim 1, wherein the first amount and the second amount are represented in decibels (dB).

16. The repeater of claim 1, wherein the controller is configured to:
decrease the gain of the first-direction signal path by increasing an attenuation level in the first-direction signal path or by adjusting a variable gain amplifier in the first-direction signal path; or
increase the gain of the second-direction signal path by decreasing an attenuation level in the second-direction signal path or by adjusting a variable gain amplifier in the second-direction signal path.

17. A repeater, comprising:
a first-direction signal path for a first-direction band;
a second-direction signal path for a second-direction band; and
a controller configured to:
disable a gain stage in the first-direction signal path; and
increase a gain in the second-direction signal path by a selected amount when the gain stage is disabled in the first-direction signal path to enable a total loop gain of the first-direction signal path and the second-direction signal path to be less than a total loop crossover isolation level of the first-direction signal path and the second-direction signal path.

18. The repeater of claim 17, wherein the total loop gain of the first-direction signal path and the second-direction signal path is to be less than a total loop crossover isolation level of the first-direction signal path and the second-direction signal path in accordance with a crossover isolation requirement for the repeater.

19. The repeater of claim 17, wherein the controller is configured to disable the gain stage in the first-direction signal path in order to reduce or mitigate an increase in a crossover isolation requirement for the repeater caused by an increase to the gain of the second-direction signal path by the selected amount.

20. The repeater of claim 19, wherein reduction or mitigation of the increase in the crossover isolation requirement for the repeater caused by the increase to the gain of the second-direction signal path enables a reduced number of bandpass filters in the repeater and a reduced passband amplitude ripple for the repeater.

21. The repeater of claim 17, wherein the controller is configured to increase the gain of the second-direction signal path by the selected amount to determine an oscillation margin between an operating gain for the second-direction signal path and an oscillation point for the second-direction signal path.

22. The repeater of claim 17, wherein the controller is configured to mitigate an oscillation in the repeater by decreasing the gain of the second-direction signal path until the oscillation ceases in the repeater.

23. The repeater of claim 17, wherein the controller is configured to:
restore the gain of the first-direction signal path to a previous amount or a new amount after mitigation of an oscillation in the repeater; and
restore a gain of the second-direction signal path to a previous amount or a new amount after mitigation of the oscillation in the repeater.

24. The repeater of claim 17, wherein:
the first-direction signal path is an uplink signal path and the first-direction band is an uplink band; and
the second-direction signal path is a downlink signal path and the second-direction band is a downlink band.

25. The repeater of claim 17, wherein:
the first-direction signal path is a downlink signal path and the first-direction band is a downlink band; and
the second-direction signal path is an uplink signal path and the second-direction band is an uplink band.

26. A method for operating a signal booster, the method comprising:
decreasing, at a controller in the signal booster, a gain of a first-direction signal path in the signal booster by a first amount; and
increasing, at the controller, a gain of a second-direction signal path in the signal booster by a second amount when the gain of the first-direction signal path is decreased by the first amount,
wherein the gain of the first-direction signal path is decreased by the first amount in order to reduce or mitigate an increase in a crossover isolation requirement for the signal booster caused by an increase to the gain of the second-direction signal path by the second amount.

27. The method of claim 26, wherein the crossover isolation requirement specifies that a total loop gain of the first-direction signal path and the second-direction signal path is to be less than a total loop crossover isolation level of the first-direction signal path and the second-direction signal path.

28. The method of claim 26, further comprising decreasing the gain of the first-direction signal path by the first amount by disabling a gain stage in the first-direction signal path.

29. The method of claim 26, further comprising increasing the gain of the second-direction signal path by the second amount for determining an oscillation margin between an operating gain for the second-direction signal path and an oscillation point for the second-direction signal path.

30. The method of claim 26, further comprising mitigating an oscillation in the signal booster by decreasing the gain of the second-direction signal path until the oscillation ceases in the signal booster.

31. The method of claim 26, further comprising:
restoring the gain of the first-direction signal path to a previous amount or a new amount after mitigation of an oscillation in the signal booster; and
restoring the gain of the second-direction signal path to a previous amount or a new amount after mitigation of the oscillation in the signal booster.

32. The method of claim 26, wherein the first amount is greater than or equal to the second amount.

* * * * *